US012513842B2

(12) United States Patent
Lam et al.

(10) Patent No.: US 12,513,842 B2
(45) Date of Patent: Dec. 30, 2025

(54) PHYSICAL LINKAGE MODULE FOR FRONTEND MODULE AND SEPARABLE CONTROL BOX MODULE

(71) Applicant: FLYTECH TECHNOLOGY CO., LTD., Taipei (TW)

(72) Inventors: Tai-Seng Lam, Taipei (TW); Ping-Kun Hsu, Taipei (TW)

(73) Assignee: FLYTECH TECHNOLOGY CO., LTD., Taipei (TW)

(*) Notice: Subject to any disclaimer, the term of this patent is extended or adjusted under 35 U.S.C. 154(b) by 113 days.

(21) Appl. No.: 18/647,045

(22) Filed: Apr. 26, 2024

(65) Prior Publication Data

US 2025/0247981 A1 Jul. 31, 2025

(30) Foreign Application Priority Data

Jan. 26, 2024 (TW) ................................ 113103199

(51) Int. Cl.
*H05K 5/00* (2025.01)
*H05K 5/02* (2006.01)
*H05K 5/03* (2006.01)
*H05K 7/02* (2006.01)

(52) U.S. Cl.
CPC ............. *H05K 7/02* (2013.01); *H05K 5/0217* (2013.01); *H05K 5/03* (2013.01)

(58) Field of Classification Search
None
See application file for complete search history.

(56) References Cited

U.S. PATENT DOCUMENTS

| | | | | |
|---|---|---|---|---|
| 8,289,698 B1* | 10/2012 | Walder | .................. | G06F 1/1632 |
| | | | | 361/679.41 |
| 8,345,429 B2* | 1/2013 | Kim | ...................... | G06F 1/1632 |
| | | | | 361/729 |
| 8,619,417 B1* | 12/2013 | Helton | .................. | G06F 1/1632 |
| | | | | 361/679.41 |
| 9,122,449 B2* | 9/2015 | DeSilva | ................. | H02G 3/081 |
| 9,294,707 B2* | 3/2016 | Kim | ......................... | H04N 5/64 |
| 9,652,002 B2* | 5/2017 | Hamann | ................. | G06F 1/189 |
| 9,857,841 B2* | 1/2018 | DeSilva | .................... | H02J 7/00 |
| 2009/0021903 A1* | 1/2009 | Chen | ..................... | G06F 1/1656 |
| | | | | 361/679.55 |
| 2017/0006718 A1* | 1/2017 | Haraguchi | ............... | H02G 3/16 |

* cited by examiner

*Primary Examiner* — Xanthia C Relford
(74) *Attorney, Agent, or Firm* — Demian K Jackson; Jackson IPG PLLC

(57) ABSTRACT

The present invention relates to a linkage module configured to provide an internal modularization connection between a frontend module and a separable control box module. The linkage module include: a linkage substrate attached to a second housing included in the frontend module; a first engaging structure configured on a first edge included in the linkage substrate and corresponding to a third engaging structure included in the separable control box module; and a first fastening structure configured on a third edge included in the linkage substrate and corresponding to a second fastening structure included in the separable control box module.

11 Claims, 10 Drawing Sheets

PHYSICAL LINKAGE MODULE FOR FRONTEND MODULE AND SEPARABLE CONTROL BOX MODULE

CROSS-REFERENCE TO RELATED APPLICATION

This application claims priority benefit to Taiwan Invention Patent Application Serial No. 113103199, filed on Jan. 26, 2024, in Taiwan Intellectual Property Office, the entire disclosures of which are incorporated by reference herein.

FIELD

The present invention relates to a linkage module providing a physical linkage for different modules, in particular to a linkage module providing a physical linkage between a frontend module and a separable control box module.

BACKGROUND

In conventional technology, all components of traditional flat panel displays, from the flat display elements to the controllers to the motherboard, are all sealed and encapsulated in the same housing body. However, such a traditional structure suffers from a lack of flexibility, resulting in several disadvantages. For example, troubleshooting and part replacement become quite difficult, maintenance becomes complex and sophisticated, and issues also arise in the aspect of hardware upgrade.

FIG. 1 is a front-view schematic diagram illustrating a conventional flat panel display in the prior art; and FIG. 2 is a schematic diagram illustrating a conventional hardware architecture in which the display module and controller are configured separately in the prior art. In order to overcome these drawbacks and to improve the convenience of logistical maintenance, the conventional flat panel displays 10 have begun to adopt a separate hardware architecture. In the design, the display module 11 and the controller 12 are each placed in a separate enclosure, respectively, rendering the display module 11 and the controller 12 two independent physical components. Then the display module 11 and the controller 12 are connected to each other in a specific way. It attempts to solve problems by introducing such a separate hardware architecture.

However, this separate hardware architecture still faces several challenges that require to be further addressed. One such challenge is the need to redesign a reliable physical linkage mechanism to ensure a simple yet robust connection between the display module 11 and the controller 12.

Another challenge is that since the display module 11 and the controller 12 are configured separately, different transmission interfaces and communication specifications in the display module 11 and the controller 12 are now forced to be paired together to form product combinations. However, how to unify different transmission interfaces to realize communication connections between the display module 11 and the controller 12 remains an urgent problem to be solved.

Hence, there is a need to solve the above deficiencies/issues.

SUMMARY

The present invention relates to a linkage module providing a physical linkage for different modules, in particular to a linkage module providing a physical linkage between a frontend module and a separable control box module.

Accordingly, the present invention provides a linkage module configured to provide an internal modularization connection between a frontend module and a separable control box module. The linkage module include: a linkage substrate attached to a second housing included in the frontend module; a first engaging structure configured on a first edge included in the linkage substrate and corresponding to a third engaging structure included in the separable control box module; and a first fastening structure configured on a third edge included in the linkage substrate and corresponding to a second fastening structure included in the separable control box module.

The present invention provides a linkage module configured to provide an internal modularization connection between a frontend module and a separable control box module. The linkage module include: a first engaging structure configured on a first edge included in the frontend module and corresponding to a third engaging structure included in the separable control box module; and a first fastening structure configured on a third edge included in the frontend module and corresponding to a second fastening structure included in the separable control box module.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
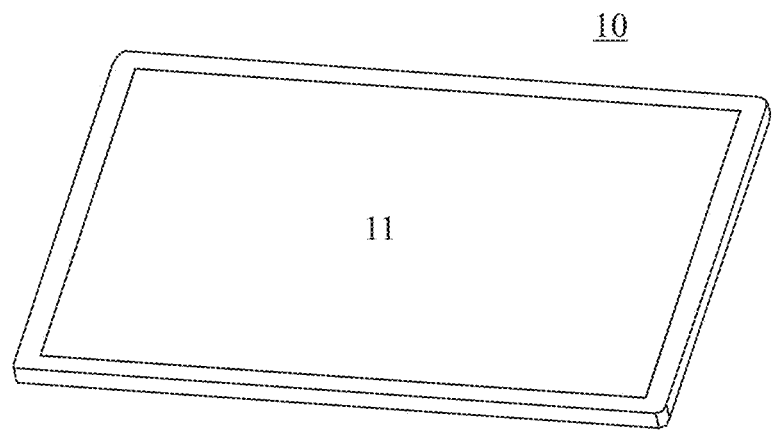
FIG. 1 is a front-view schematic diagram illustrating a conventional flat panel display in the prior art.
Figure 2:
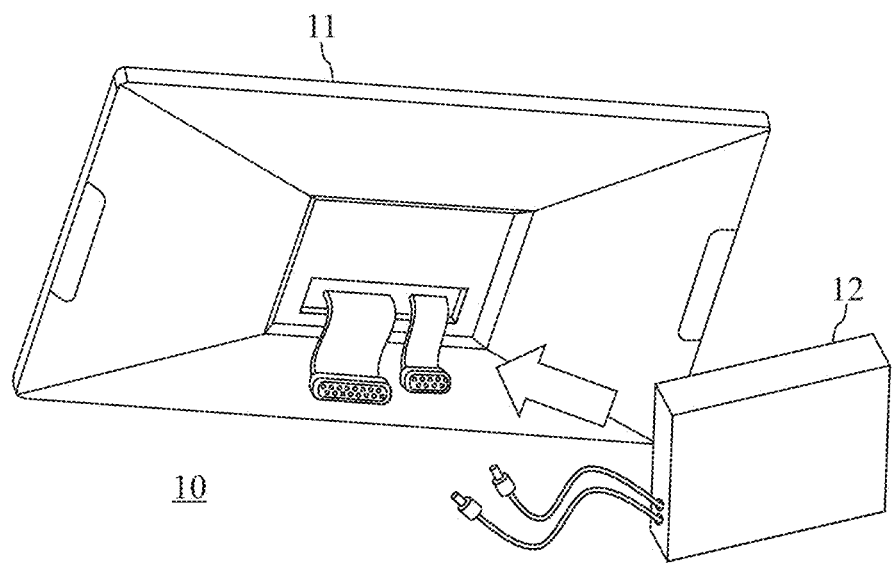
FIG. 2 is a schematic diagram illustrating a conventional hardware architecture in which the display module and controller are configured separately in the prior art.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

Figure 3:
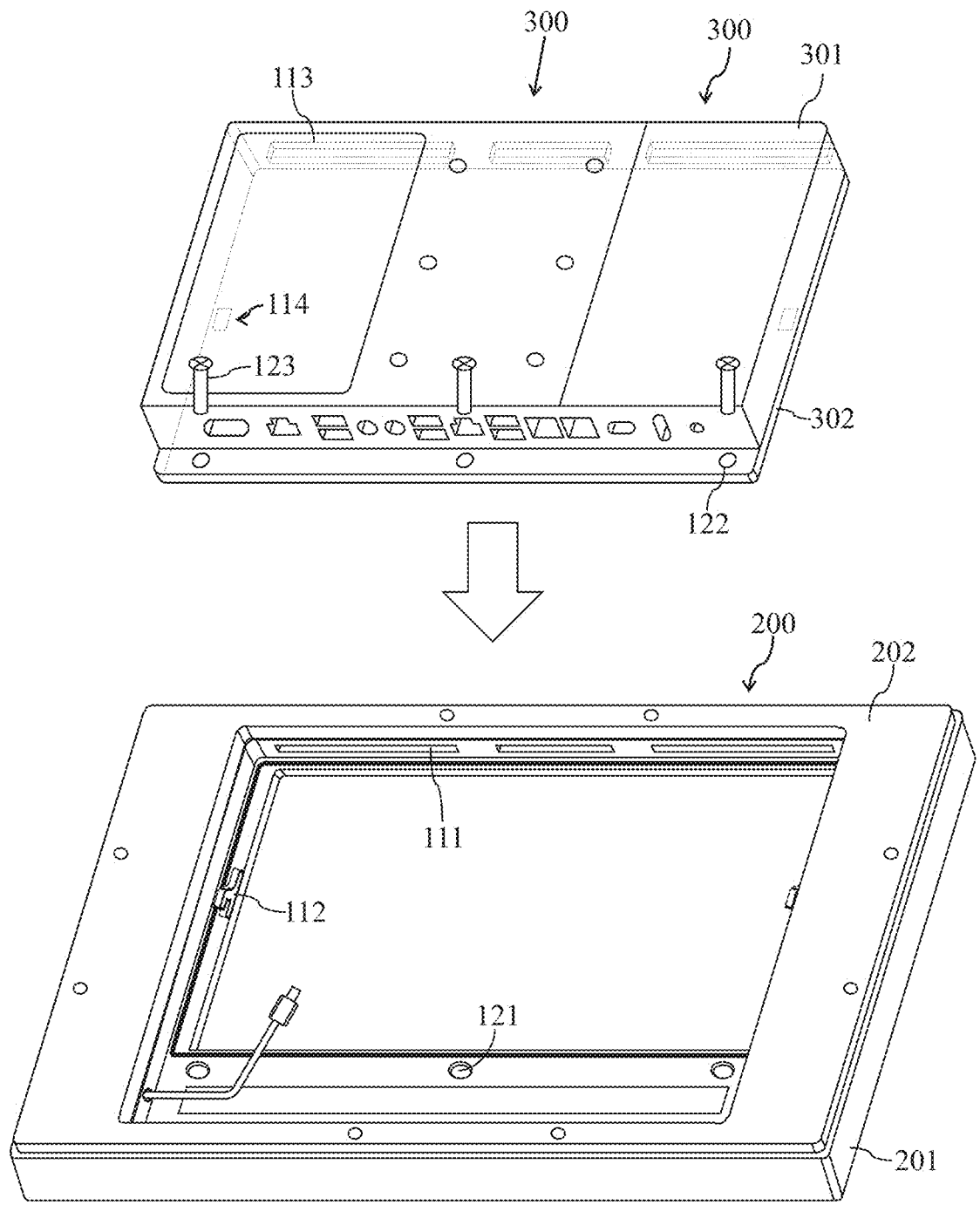
FIG. 3 is a structural schematic diagram illustrating the frontend module and the separable control box module included in the present invention.

FIG. 3 is a structural schematic diagram illustrating the frontend module and the separable control box module included in the present invention. The linkage module 100 is preferably attached to the rear side of the frontend module 200, for example, but not limited to, the second housing 202, and is sandwiched between the frontend module 200 and the separable control box module 300, in order to provide a physical linkage between the frontend module 200 and the separable control box module 300. The frontend module 200 includes the housing parts which include the the first housing 201 functioning as the front housing and the second housing 202 functioning as the rear housing, while the separable control box module 300 includes the cover parts which include the first cover 301 functioning as the top cover and the second cover 302 functioning as the bottom cover.

The linkage module 100 includes multiple first engaging structures 111, multiple second engaging structures 112, and multiple first fastening structures 121 distributed and configured on the frontend module 200, and multiple third engaging structures 113, multiple fourth engaging structures 114, multiple second fastening structures 122, and multiple fasteners 123 distributed and configured on the separable control box module 300.

Figure 4:
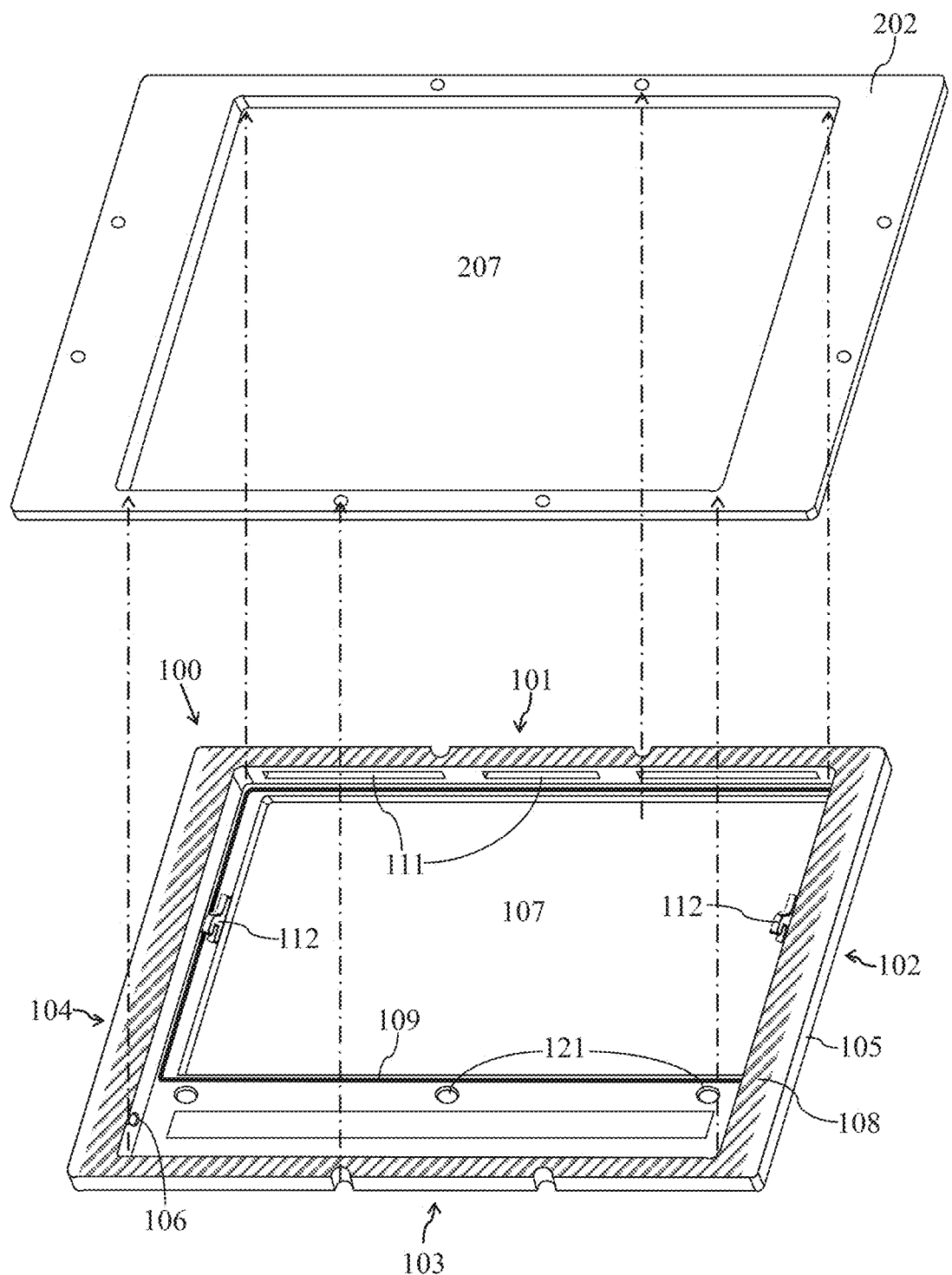
FIG. 4 is an exploded-view structural schematic diagram illustrating the second housing and the linkage module included in the present invention.

FIG. 4 is an exploded-view structural schematic diagram illustrating the second housing and the linkage module included in the present invention. The linkage module 100 selectively includes a linkage substrate 105, which has four edges, including the first edge 101, the second edge 102, the third edge 103, and the fourth edge 104, and is also provided with a wiring opening 106. Preferably, the linkage substrate 105 has a central portion that is opened with a central opening 107, although it is also preferable that the linkage substrate 105 is configured not to open the central opening 107.

The multiple first engaging structures 111, multiple second engaging structures 112, and the multiple first fastening structures 121 are each configured on different edges of the linkage substrate 105. For example, the multiple first engaging structures 111 are preferably configured on the first edge 101 included in the linkage substrate 105, multiple second engaging structures 112 are preferably distributed on the second edge 102 and the fourth edge 104 included in the linkage substrate 105, and the multiple first fastening structures 121 are preferably configured on the third edge 103 included in the linkage substrate 105, respectively.

The multiple first engaging structures 111 and multiple second engaging structures 112 are preferably, but not limited to, structures such as grooves, recesses, protrusions, positioning holes, assembly holes, mounting holes, positioning slots, hole positions, openings, apertures, blind holes, tenons, pins, clasps, buckles, latches, snap, snap-fit, snap fasteners, snap hooks, slots, pins, buckle rings, press studs, or quick-release structures. In this embodiment, the multiple first engaging structures 111 are preferably multiple slots, each of which slot is a blind hole based slot, while multiple second engaging structures 112 are preferably a pair of snap hooks.

The multiple first fastening structures 121 are preferably, but not limited to, structures such as positioning holes, assembly holes, mounting holes, hole positions, openings, apertures, screws, threaded holes, tapped holes, bolts, nuts, rivets, or circlips. In this embodiment, the multiple first fastening structures 121 are preferably multiple tapped holes.

The frontend module 200 includes the second housing 202 which has a rectangular substrate opening 207 in the middle portion to provide the linkage substrate 105 for positioning and configuration. The substrate opening 207 has a geometric shape corresponding to that of the linkage substrate 105, to provide the linkage substrate 105 for positioning and configuration, after aligning with the substrate opening 207. s In some embodiments, the linkage substrate 105 is preferably attached to the second housing 202 by, for example, bonding, screwing, or a combination of bonding and screwing. For example, the linkage substrate 105 is attached to the second housing 202 by a ring of waterproofing adhesive layer 108 applied and coated around the edges, such as the second edge 102 and the fourth edge 104, to form a first assembly 204.

In an embodiment where a central opening 107 is opened, in order to prevent moisture and droplets from entering the interior space inside the frontend module 200 through assembly seams distributed around the central opening 107, a ring of waterproofing component 109 is configured around the central opening 107, to seal the assembly seams. Preferably, the ring of waterproofing component 109 includes, but is not limited to, a rubber O-ring. Once the linkage substrate 105 is successfully bonded to the second housing 202, the presence of the ring of waterproofing component 109 ensures that moisture or droplets do not enter the interior space of the frontend module 200 after the first housing 201 and the second housing 202 are assembled together, and the separable control box module 300 and frontend module 200 are assembled together.

In some embodiments, the linkage substrate 105 and the second housing 202 are individual components that are separate and independent from each other to enable the linkage substrate 105 included in the linkage module 100 to be attached to second housings 202 with different specifications. The second housings 202 associated with different frontend modules 200 are made of materials including, but not limited to, stainless steel, die-cast materials, or plastics.

In certain embodiments, the linkage substrate 105, the multiple first engaging structures 111, multiple second engaging structures 112, and the multiple first fastening structures 121 may be directly fabricated and molded onto the second housing 202 by methods such as, but not limited to, integral molding or injection molding, thereby becoming an integral part of the second housing 202.

Figure 5:
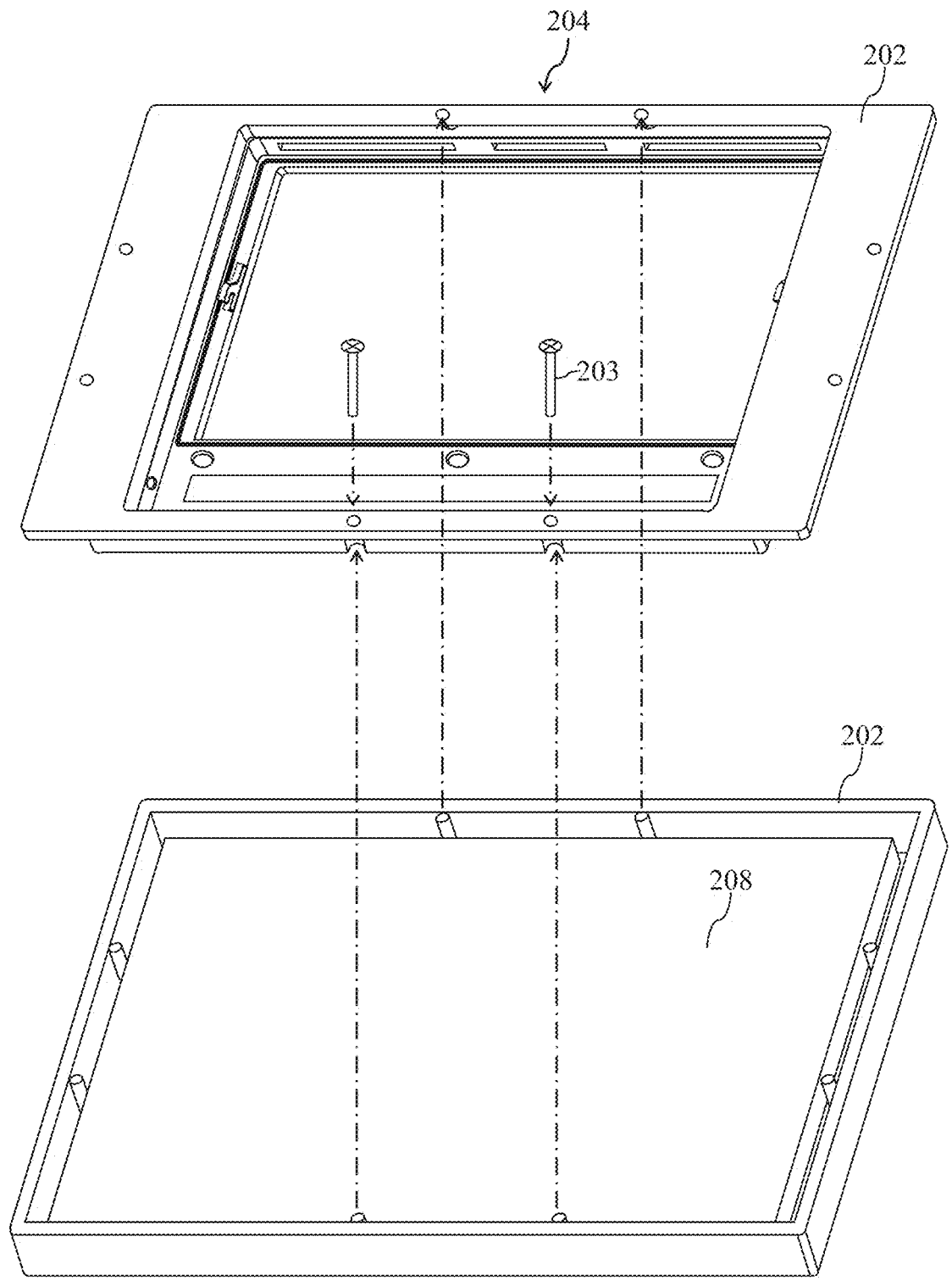
FIG. 5 is an exploded-view structural schematic diagram illustrating the first assembly and the first housing included in the present invention.
Figure 6:
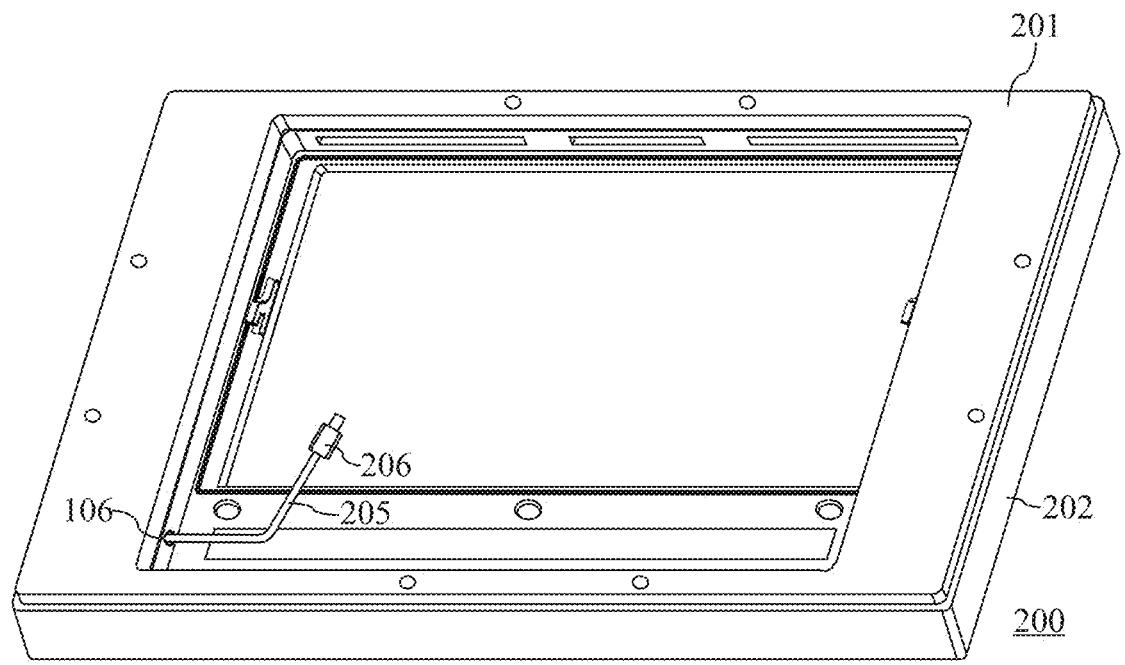
FIG. 6 is a structural schematic diagram illustrating the rear side of the frontend module included in the present invention.
Figure 7:
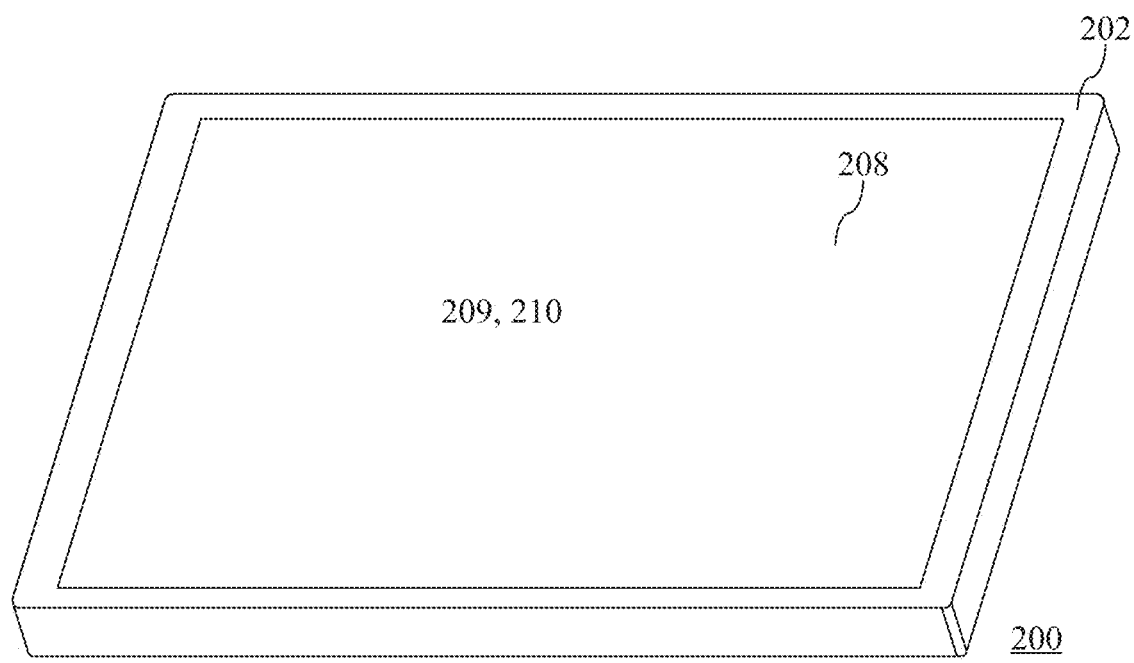
FIG. 7 is a structural schematic diagram illustrating the front side of the frontend module included in the present invention.

FIG. 5 is an exploded-view structural schematic diagram illustrating the first assembly and the first housing included in the present invention; FIG. 6 is a structural schematic diagram illustrating the rear side of the frontend module included in the present invention; and FIG. 7 is a structural schematic diagram illustrating the front side of the frontend module included in the present invention. The first assembly 204 and the first housing 201 are fixed together with screws 203 to form the frontend module 200. In the process of screwing the first assembly 204 to the first housing 201 with screws, the linkage substrate 105 and the second housing 202 also receive a second-time reinforced connection by screwing, in addition to the previous first-time adhesive bonding connection.

The first housing 201 is already configured with a display component 208 inside, which preferably covers display products with different specifications, including various touch screen products, various touch display products, and various flat-panel display products. The different specifications covers, but are not limited to, different sizes, different brands, different operating principles, or different sources.

For example, the display component 208 with different sizes includes, but is not limited to: the display products having sizes of 10.1 inches, 11.6 inches, 13.3 inches, 14 inches, 15.1 inches, 15.6 inches, 17 inches, 18.5 inches, 21.5 inches, 27 inches, 28 inches to 32 inches, etc. The display component 208 with different operating principles includes, but is not limited to: the LCD display products, the OLED display products, the MicroLED display products, the AMOLED display products, and the plasma display products, etc.

The display product refers to a display component that has full display functionality but has not yet been communicatively connected to the internal controller, nor has it been assembled with the external housing that functions as the external component. As compared to the external housing functioning as an external component, the display component 208 is preferably regarded as an internal component.

The display component 208 is mounted in the first housing 201. The display component 208 provides digital images for the display surface 210 configured on the front side 209 of the frontend module 200, in order to present information to the user.

The display component 208 can only begin its electrical operation and display information to the user under the control of the separable control box module 300, and therefore the display component 208 inside the frontend module 200 must establish an internal communication connection with the separable control box module 300.

The single transmission line 205 and the single internal transmission connector 206 included in and from the frontend module 200 are exposed from the wiring opening 106 included in the linkage module 100, to provide a unified communication connection with the separable control box module 300.

Figure 8:
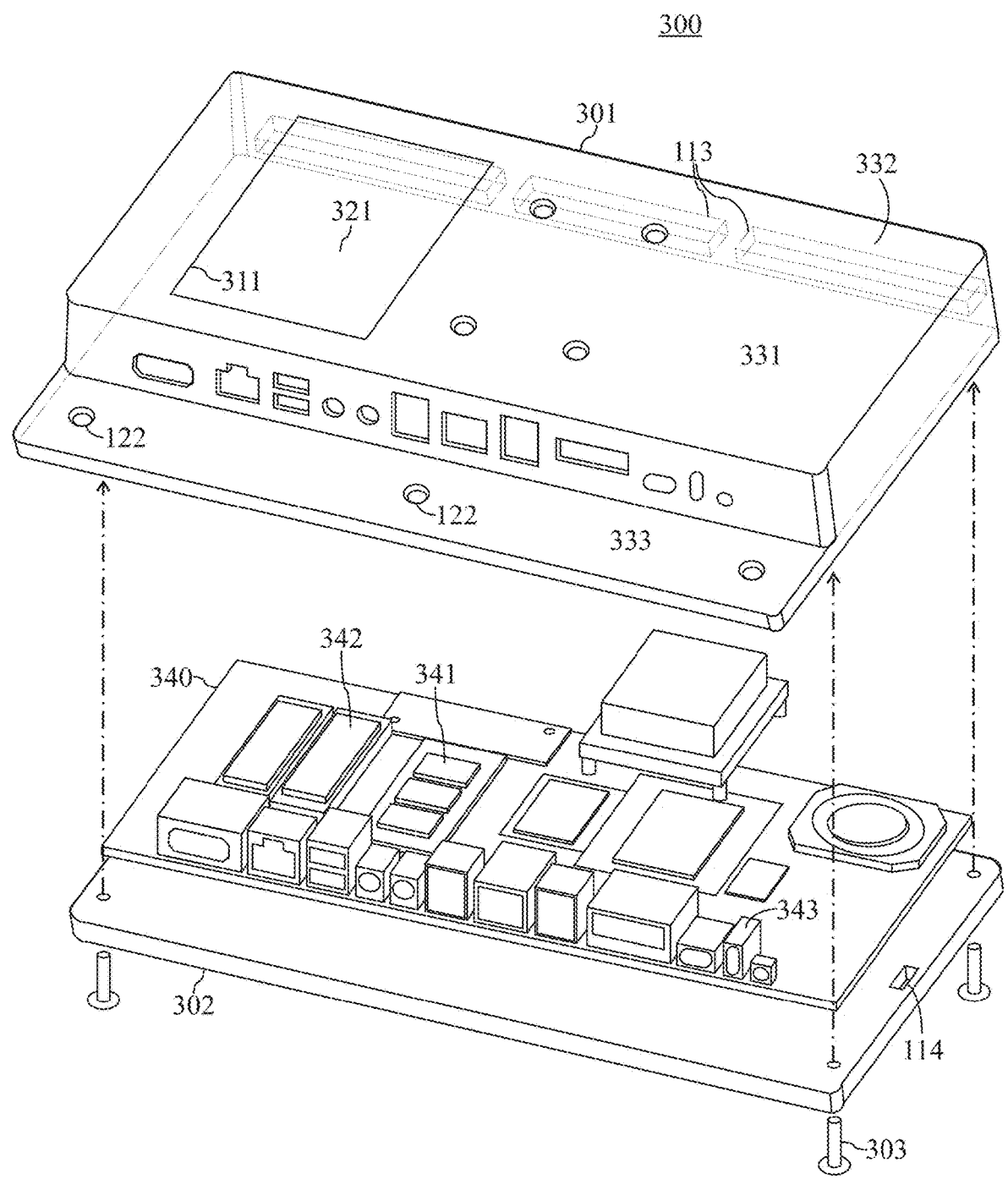
FIG. 8 is an exploded-view structural schematic diagram illustrating the separable control box module and the frontend module included in the present invention.

FIG. 8 is an exploded-view structural schematic diagram illustrating the separable control box module and the frontend module included in the present invention. The separable control box module 300 has the cover parts which include the first cover 301 and the second cover 302, which are preferably assembled together, such as with multiple screws 303, to form a box-shaped body on the outer appearance and to create a rectangular space inside so that the main control circuit board 340 is configured therein.

The main control circuit board 340 includes a memory 341, a storage medium 342, and a single internal communication connector 343. The single internal communication connector 343 is used for communicative connection with the single internal transmission connector 206 provided by the single transmission line 205 included in the frontend module 200, in order to unify the signal interface between the frontend module 200 and the separable control box module 300.

On the first side 331 included in the first cover 301, there is further a first opening 311 configured thereon and a first cover plate 321 corresponding to the first opening 311 for sealing the first opening 311. The position of the first opening 311 corresponds to the positions of both the memory 341 and the storage media 342, so as to provide users to easily maintain, replace, or upgrade the memory 341 and the storage media 342.

On the second side 332 included in the first cover 301, there are further multiple third engaging structures 113 configured thereon, and on the third side 333 included in the first cover 301, there are further multiple second fastening structures 122 configured thereon. The second cover 302 is also configured with multiple fourth engaging structures 114.

The multiple third engaging structures 113 and the multiple fourth engaging structures 114 are preferably, but not limited to, structures such as grooves, recesses, protrusions, positioning holes, assembly holes, mounting holes, positioning slots, hole positions, openings, apertures, blind holes, tenons, pins, clasps, buckles, latches, snap, snap-fit, snap fasteners, snap hooks, slots, pins, buckle rings, press studs, or quick-release structures. In this embodiment, the multiple third engaging structures 113 are preferably multiple tenons, while the multiple fourth engaging structures 114 are preferably multiple slots.

The multiple second fastening structures 122 are preferably, but not limited to, structures such as positioning holes, assembly holes, mounting holes, hole positions, openings, apertures, screws, threaded holes, tapped holes, bolts, nuts, rivets, or circlips. In this embodiment, the multiple second fastening structures 122 are preferably multiple openings.

Figure 9:
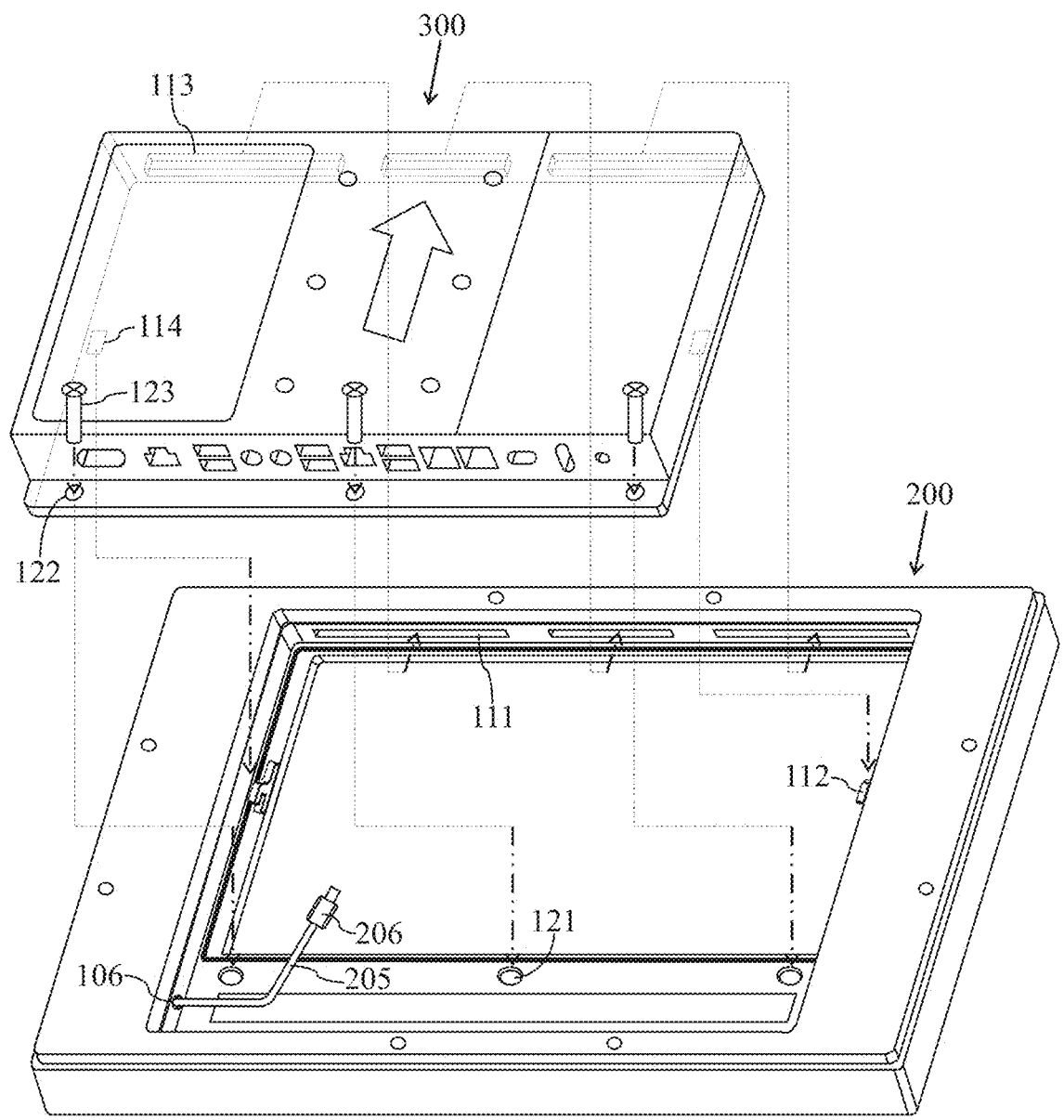
FIG. 9 is an exploded-view structural schematic diagram illustrating the separable control box module and the frontend module included in the present invention.

FIG. 9 is an exploded-view structural schematic diagram illustrating the separable control box module and the frontend module included in the present invention. The multiple first engaging structures 111, multiple second engaging structures 112, and the multiple first fastening structures 121 included in the linkage module 100 attached within the frontend module 200 preferably correspond to the multiple third engaging structures 113, the multiple fourth engaging structures 114, and the multiple second fastening structures 122 included in the separable control box module 300, respectively. The multiple first engaging structures 111 preferably correspond to, fit into and are linked to with the multiple third engaging structures 113, multiple second engaging structures 112 preferably correspond to, fit into and are linked to with the multiple fourth engaging structures 114, and the multiple first fastening structures 121 and the multiple second fastening structures 122 are mutually fastened and connected to each other by the multiple fasteners 123, such as screws, thereby enabling the separable control box module 300 to be attached and connected to the frontend module 200 by the linkage capability provided by the linkage module 100.

Figure 10:
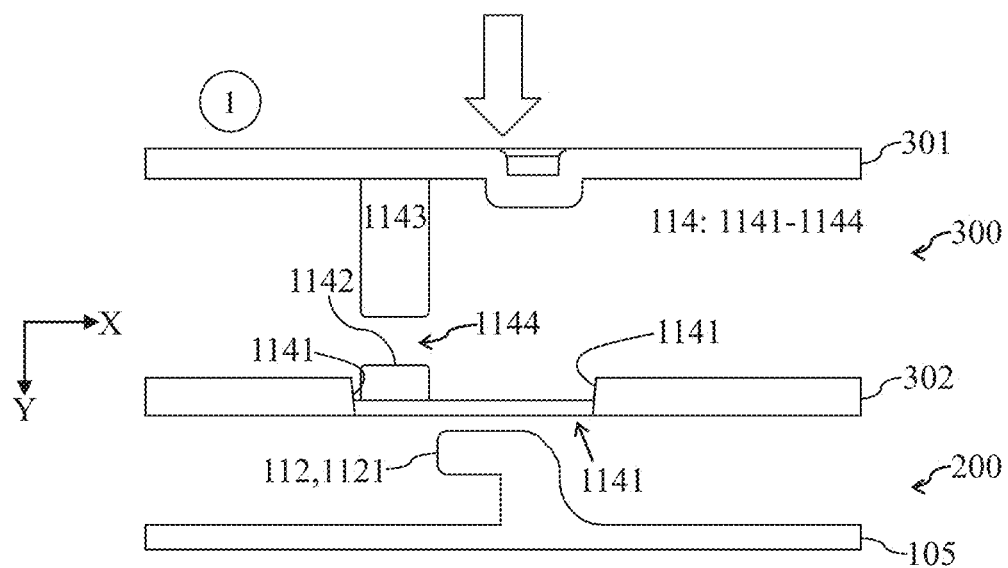
FIG. 10 is a cross-sectional structural schematic diagram illustrating the second engaging structure and the fourth engaging structure in an aligned state according to the present invention.
Figure 11:
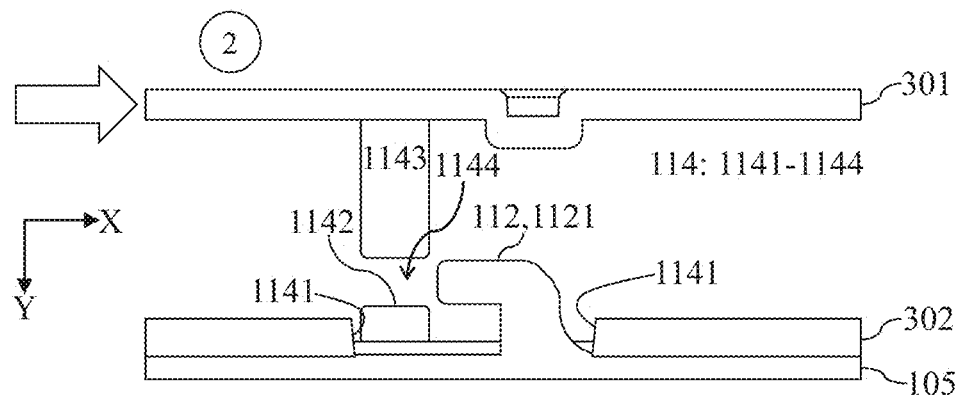
FIG. 11 is a cross-sectional structural schematic diagram illustrating the second engaging structure and the fourth engaging structure in an engaging preparation state according to the present invention.
Figure 12:
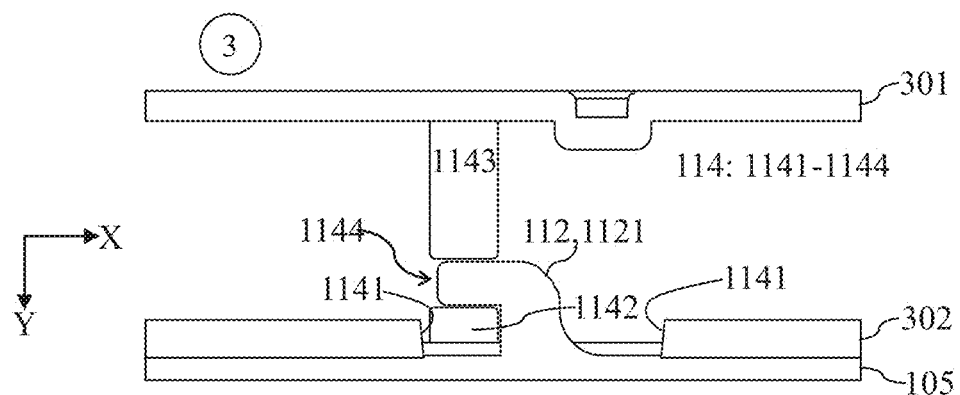
FIG. 12 is a cross-sectional structural schematic diagram illustrating the second engaging structure and the fourth engaging structure in the locked state according to the present invention.
Figure 13:
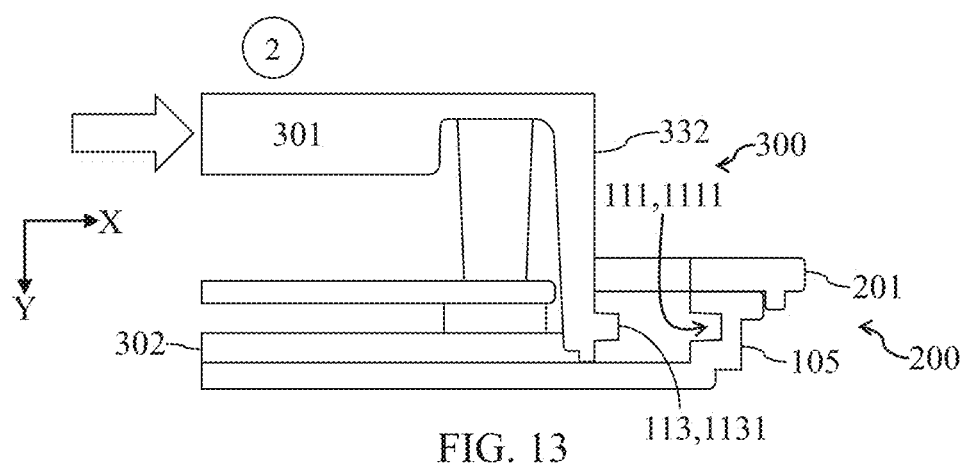
FIG. 13 is a cross-sectional structural schematic diagram illustrating the first engaging structure and the third engaging structure in the engaging preparation state according to the present invention.
Figure 14:
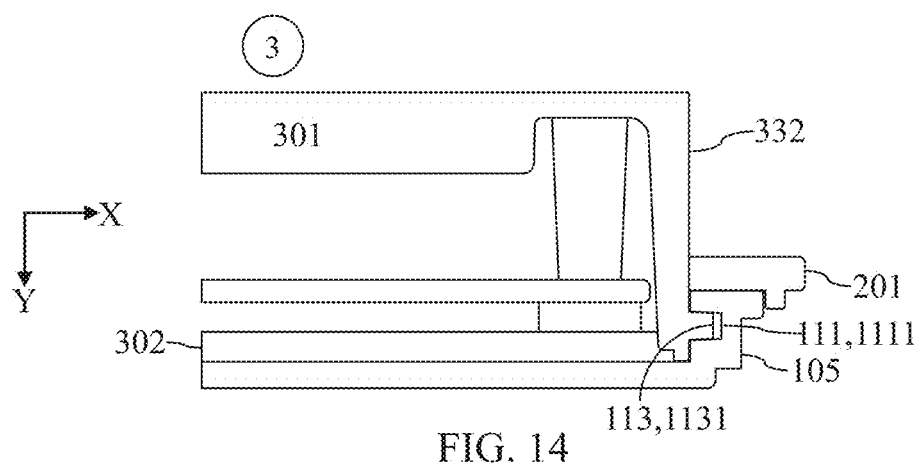
FIG. 14 is a cross-sectional structural schematic diagram illustrating the first engaging structure and the third engaging structure in the locked state according to the present invention.
Figure 15:
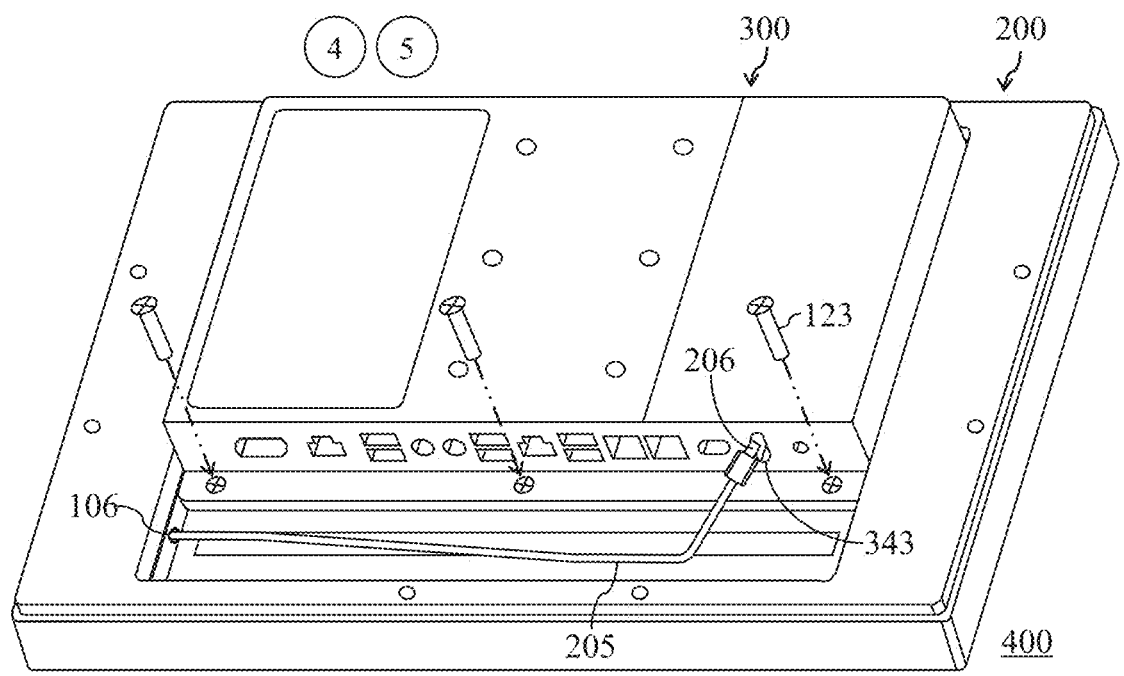
FIG. 15 is the structural schematic diagram illustrating the separable control box module and the frontend module in the coupled state and the fastened state according to the present invention.

FIG. 10 is a cross-sectional structural schematic diagram illustrating the second engaging structure and the fourth engaging structure in an aligned state according to the present invention; FIG. 11 is a cross-sectional structural schematic diagram illustrating the second engaging structure and the fourth engaging structure in an engaging preparation state according to the present invention; FIG. 12 is a cross-sectional structural schematic diagram illustrating the second engaging structure and the fourth engaging structure in the locked state according to the present invention; FIG. 13 is a cross-sectional structural schematic diagram illustrating the first engaging structure and the third engaging structure in the engaging preparation state according to the present invention; FIG. 14 is a cross-sectional structural schematic diagram illustrating the first engaging structure and the third engaging structure in the locked state according to the present invention; FIG. 15 is the structural schematic diagram illustrating the separable control box module and the frontend module in the coupled state and the fastened state according to the present invention.

In some embodiments, the multiple first engaging structures 111 preferably include multiple slots in the form of blind holes 1111, multiple second engaging structures 112 preferably include multiple snap hooks 1121, the multiple third engaging structures 113 preferably include multiple tenons 1131, and the multiple fourth engaging structures 114 preferably include multiple openings 1141, multiple stoppers 1142, multiple abutters 1143, and multiple restrain slots 1144.

When the separable control box module 300 is to be combined with the frontend module 200, the user only needs to perform the following four simple steps to assemble the separable control box module 300 with the frontend module 200.

The first step is the alignment step, in which the user simply aligns the pair of openings 1141 included in the multiple fourth engaging structures 114 in the separable control box module 300 with the pair of snap hooks 1121 configured on the linkage substrate 105 included in the frontend module 200, to bring the multiple fourth engaging structures 114 and multiple second engaging structures 112 into an aligned state ①, as shown in FIG. 10.

The second step is the engaging preparation step. Under the condition that the multiple fourth engaging structures 114 are already aligned with multiple second engaging structures 112, the user then puts down the separable control box module 300 along and toward the Y direction, which lowers the snap hooks 1121 to enter the openings 1141, to bring the multiple fourth engaging structures 114 and multiple second engaging structures 112 into an engaging preparation state ②, as shown in FIG. 11.

In the state, the multiple tenons 1131 included in the multiple third engaging structures 113 configured on the first cover 301 included in the separable control box module 300 are automatically aligned with the multiple slots 1111 included in the multiple first engaging structures 111 configured on the linkage substrate 105 included in the frontend module 200, to correspondingly bring the multiple third engaging structures 113 and the multiple first engaging structures 111 into the engaging preparation state ②, as shown in FIG. 13.

The third step is the locked step. The user gently pushes the separable control box module 300 to move along and toward the X direction, thereby moving the multiple snap hooks 1121 to insert into the multiple restrain slots 1144 in a rectangular shape formed by the multiple stoppers 1142 and the multiple abutters 1143, until the multiple snap hooks 1121 are stopped from moving by the multiple stoppers 1142. Under the restriction provided by the multiple abutters 1143 and the multiple restrain slots 1144, the multiple snap hooks 1121 cannot move in the Y direction, to bring the multiple fourth engaging structures 114 and the multiple second engaging structures 112 into a locked state ③, as shown in FIG. 12.

In the state, the multiple tenons 1131 included in the multiple third engaging structures 113 also automatically move to insert into the multiple slots 1111 included in the multiple first engaging structures 111, to correspondingly bring the multiple third engaging structures 113 and the multiple first engaging structures 111 into the locked state ③, as shown in FIG. 14.

After the multiple fourth engaging structures 114 and the multiple second engaging structures 112, as well as the multiple third engaging structures 113 and the multiple first engaging structures 111, have all entered the locked state ③, the separable control box module 300 and the frontend module 200 are temporarily joined and coupled together through the linkage capability provided by the linkage module 100 and enter a coupled state ①, which is coupled but not yet fixed, as shown in FIG. 15.

The fourth step is the fastening step. After the multiple fourth engaging structures 114 and the multiple second engaging structures 112, as well as the multiple third engaging structures 113 and the multiple first engaging structures 111, have all entered the locked state ③, the multiple second fastening structures 122 included in the separable control box module 300 are automatically aligned with the multiple first fastening structures 121. The user uses the multiple fasteners 123 such as screws, passes them through the multiple second fastening structures 122 and then screws them into the multiple first fastening structures 121, to bring the multiple second fastening structures 122 and the multiple first fastening structures 121 into a fastened state ⑤. Accordingly, the separable control box module 300 is capable of being attached and linked to the frontend module 200 through the linkage capability provided by the linkage module 100, to form an information system 400, as shown in FIG. 15.

The linkage module 100 provides the user with a two-stage easy operation by combining the engaging operation and the fastening operation together. In the first stage, the engaging operation stage includes transition from the aligned state ① to the snap-lock state ③ and the coupled state ④. It provides the user, through simple manual operations, to render the separable control box module 300 and the frontend module 200 to engage with each other to enter a temporarily coupled state. After the engagement is completed, the multiple first fastening structures 121 and the multiple second fastening structures 122 are also automatically self-aligned. Then, in the second stage, the fastening operation stage includes the fastened state ⑤. Users only need to screw the self-aligned structures, and the physical linkage between the separable control box module 300 and the frontend module 200 can be easily completed.

In some embodiments, the multiple first engaging structures 111 and the multiple third engaging structures 113 are preferably a combination of slots and tenons, while multiple second engaging structures 112 and the multiple fourth engaging structures 114 are preferably a combination of snap hooks and slots that offer an anti-detachment effect that prevents the separable control box module 300 from detaching backward (opposite to the Y direction).

In some embodiments, because the linkage substrate 105 is a key component for linking the separable control box module 10 and the frontend module 20, it is preferable to design the linkage substrate 105 to have sufficient structural strength to support the combined weight of the separable control box module 300 and the frontend module 200.

Under the condition that the central opening 107 is opened, when the separable control box module 300 and the frontend module 200 are assembled, the waterproofing component 109 ensures that moisture and droplets do not enter the internal space of the frontend module 200, thereby maintaining a watertight sealed condition inside the frontend module 200.

As for the communication connection, the single internal transmission connector 206 included in the frontend module 200 only needs to be inserted into the corresponding single internal communication connector 343 configured on the separable control box module 300. It provides an easy and quick setting and completion for the communication connection between the separable control box module 300 and the frontend module 200 by simply using the single transmission line 205, so as to achieve a unified signal interface between the frontend module and the separable control box module 300 by unifying the transmission interface.

In some embodiments, the main control circuit board 340 included in the separable control box module 300 is preferably capable of providing versatile functionalities such as point of sale (POS), panel PC, information Kiosk, and self-checkout (SOC). Therefore, by exchanging the separable control box modules 300 having different functionalities, the frontend module 200 and the separable control box module 300 can be versatilely transformed into different application-end information systems 400, including but not limited to: POS terminals, tablet computers, medical tablets, Kiosk stations, SOC terminals, etc.

In summary, the present invention further has the following features and advantages: (1) quick assembly saves time; (2) easy manufacturing saves mold costs; (3) easy and flexible material preparation; (4) convenient for production; and (5) easy inventory management.

There are further embodiments provided as follows.

Embodiment 1: A linkage module configured to provide an internal modularization connection between a frontend module and a separable control box module, include: a linkage substrate attached to a second housing included in the frontend module; a first engaging structure configured on a first edge included in the linkage substrate and corresponding to a third engaging structure included in the separable control box module; and a first fastening structure configured on a third edge included in the linkage substrate and corresponding to a second fastening structure included in the separable control box module.

Embodiment 2: The linkage module as described in embodiment 1, further include: a second engaging structure configured on a second edge or a fourth edge included in the linkage substrate and corresponding to a fourth engaging structure included in the separable control box module; the third engaging structure configured on a first cover or a second cover included in the separable control box module and corresponding to the first engaging structure; the fourth engaging structure configured on the first cover or the second cover included in the separable control box module and corresponding to the second engaging structure; and the second fastening structure configured on the first cover or the second cover included in the separable control box module and corresponding to the first fastening structure.

Embodiment 3: The linkage module as described in embodiment 2, the fourth engaging structure further includes one of an opening, a stopper component, an abutter component, and a restrain slot.

Embodiment 4: The linkage module as described in embodiment 1, the second housing further includes: a substrate opening having a geometric shape corresponding to that of the linkage substrate to provide the linkage substrate for positioning and configuration; the first engaging structure formed on the second housing; the second engaging structure formed on the second housing; and the first fastening structure formed on the second housing.

Embodiment 5: The linkage module as described in embodiment 1, the linkage substrate further includes: a waterproofing adhesive layer coated on the linkage substrate and sandwiched between the linkage substrate and the second housing to provide the linkage substrate and the second housing to be bonded together by the waterproofing adhesive layer; a waterproofing component configured on the linkage substrate and sandwiched between the linkage substrate and the second housing to provide a water seal for the gap formed between the linkage substrate and the second housing; and a wiring opening opened on the linkage substrate to provide a single transmission line and a single internal transmission connector included in the frontend module to be exposed from the wiring opening.

Embodiment 6: The linkage module as described in embodiment 5, the separable control box module further includes: a first cover including one of the third engaging structure, the fourth engaging structure, and the second fastening structure; a second cover coupled to the first cover and including one of the third engaging structure, the fourth engaging structure, and the second fastening structure; and a main control circuit board including a single internal communication connector configured to communicatively connect with the single internal transmission connector, so as to unify a signal interface between the frontend module and the separable control box module.

Embodiment 7: The linkage module as described in embodiment 1, the frontend module further includes: a first housing configured to secure a display component and including a display surface for displaying information provided by the display component; and the second housing coupled to the first housing.

Embodiment 8: The linkage module as described in embodiment 1, the linkage substrate has a structural strength capable of supporting a combined weight of the frontend module and the separable control box module.

Embodiment 9: The linkage module as described in embodiment 1, the frontend module and the separable control box module enter a linked state through an engaged linkage among the first and second engaging structures and the third and fourth engaging structures.

Embodiment 10: The linkage module as described in embodiment 9, after the frontend module and the separable control box module have entered the linked state, the frontend module and the separable control box module further enter a fastened state through a fastened linkage between the first and second fastening structures.

Embodiment 11: A linkage module configured to provide an internal modularization connection between a frontend module and a separable control box module, include: a first engaging structure configured on a first edge included in the frontend module and corresponding to a third engaging structure included in the separable control box module; and a first fastening structure configured on a third edge included in the frontend module and corresponding to a second fastening structure included in the separable control box module.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A linkage module configured to provide an internal modularization connection between a frontend module and a separable control box module, comprising:
    a linkage substrate attached to a second housing comprised in the frontend module;
    a first engaging structure configured on a first edge comprised in the linkage substrate and corresponding to a third engaging structure comprised in the separable control box module; and
    a first fastening structure configured on a third edge comprised in the linkage substrate and corresponding to a second fastening structure comprised in the separable control box module.

2. The linkage module as claimed in claim 1, further comprising:
    a second engaging structure configured on a second edge or a fourth edge comprised in the linkage substrate and corresponding to a fourth engaging structure comprised in the separable control box module;
    the third engaging structure configured on a first cover or a second cover comprised in the separable control box module and corresponding to the first engaging structure;
    the fourth engaging structure configured on the first cover or the second cover comprised in the separable control box module and corresponding to the second engaging structure; and
    the second fastening structure configured on the first cover or the second cover comprised in the separable control box module and corresponding to the first fastening structure.

3. The linkage module as claimed in claim 2, wherein the fourth engaging structure further comprises one of an opening, a stopper component, an abutter component, and a restrain slot.

4. The linkage module as claimed in claim 2, wherein the second housing further comprises:
    a substrate opening having a geometric shape corresponding to that of the linkage substrate to provide the linkage substrate for positioning and configuration;
    the first engaging structure formed on the second housing;
    the second engaging structure formed on the second housing; and
    the first fastening structure formed on the second housing.

5. The linkage module as claimed in claim 2, wherein the linkage substrate further comprises:
    a waterproofing adhesive layer coated on the linkage substrate and sandwiched between the linkage substrate and the second housing to provide the linkage substrate and the second housing to be bonded together by the waterproofing adhesive layer;
    a waterproofing component configured on the linkage substrate and sandwiched between the linkage substrate and the second housing to provide a water seal for the gap formed between the linkage substrate and the second housing; and
    a wiring opening opened on the linkage substrate to provide a single transmission line and a single internal transmission connector comprised in the frontend module to be exposed from the wiring opening.

6. The linkage module as claimed in claim 5, wherein the separable control box module further comprises:
    a first cover comprising one of the third engaging structure, the fourth engaging structure, and the second fastening structure;
    a second cover coupled to the first cover and comprising one of the third engaging structure, the fourth engaging structure, and the second fastening structure; and
    a main control circuit board comprising a single internal communication connector configured to communicatively connect with the single internal transmission connector, so as to unify a signal interface between the frontend module and the separable control box module.

7. The linkage module as claimed in claim 1, wherein the frontend module further comprises:
    a first housing configured to secure a display component and comprising a display surface for displaying information provided by the display component; and
    the second housing coupled to the first housing.

8. The linkage module as claimed in claim 1, wherein the linkage substrate has a structural strength capable of supporting a combined weight of the frontend module and the separable control box module.

9. The linkage module as claimed in claim 2, wherein the frontend module and the separable control box module enter a linked state through an engaged linkage among the first and second engaging structures and the third and fourth engaging structures.

10. The linkage module as claimed in claim 9, wherein after the frontend module and the separable control box module have entered the linked state, the frontend module and the separable control box module further enter a fastened state through a fastened linkage between the first and second fastening structures.

11. A linkage module configured to provide an internal modularization connection between a frontend module and a separable control box module, comprising:
- a first engaging structure configured on a first edge comprised in the frontend module and corresponding to a third engaging structure comprised in the separable control box module; and
- a first fastening structure configured on a third edge comprised in the frontend module and corresponding to a second fastening structure comprised in the separable control box module.

* * * * *